United States Patent [19]

Miyabe

[11] Patent Number: 5,026,267

[45] Date of Patent: Jun. 25, 1991

[54] APPARATUS FOR FORMING THERMOPLASTIC MATERIAL

[75] Inventor: Hideki Miyabe, Kakamigahara, Japan

[73] Assignees: Kawasaki Jukogyo Kabushiki Kaisha; Japan Aircraft Development Corporation, both of Japan

[21] Appl. No.: 446,803

[22] Filed: Dec. 6, 1989

[30] Foreign Application Priority Data

Dec. 14, 1988 [JP] Japan .................................. 63-315944

[51] Int. Cl.⁵ ............................................. B29C 33/20
[52] U.S. Cl. .................................... 425/451.9; 249/82;
249/167; 269/240; 269/285; 425/541
[58] Field of Search ...................... 425/541, 813, 451.9;
264/327; 249/167, 82, 163, 195, 196; 269/240,
254 R, 285, 273

[56] References Cited

U.S. PATENT DOCUMENTS

| | | | |
|---|---|---|---|
| 1,035,616 | 8/1912 | Mahoney | 425/813 X |
| 1,310,439 | 7/1919 | Roberts | 425/813 X |
| 2,270,830 | 1/1942 | Chace | 249/167 X |
| 2,329,425 | 9/1943 | Steel | 425/812 X |
| 2,618,130 | 11/1952 | Leichtman et al. | 249/167 |
| 3,165,569 | 1/1965 | Bright | 264/327 X |
| 3,287,486 | 11/1966 | Jurgeleit et al. | 425/451.9 |
| 4,269,385 | 5/1981 | Bowman | 249/163 |
| 4,344,601 | 8/1982 | Fink et al. | 249/167 |
| 4,416,440 | 11/1983 | Bowman et al. | 249/82 |
| 4,854,844 | 8/1989 | Carlsen | 425/466 X |

FOREIGN PATENT DOCUMENTS 2313844 12/1976 France .................................. 249/82

OTHER PUBLICATIONS

Text Book entitled "Practical Knowledge on Plastics, 4th Edition", published by Toyo Keizai Shinpo Sha, Tokyo, Japan, Dec. 26, 1985 by Mitsuo Fukii, Professor Keio University and Hiroshi Kakiuchi, Professor Yokohama National University.

Primary Examiner—Jay H. Woo
Assistant Examiner—Robert B. Davis
Attorney, Agent, or Firm—Stevens, Davis, Miller & Mosher

[57] ABSTRACT

The apparatus includes a pair of molds each having a peripheral flange provided with a mating surface. The molds are clamped by a suitable number of clamp assemblies for clamping the flanges of the molds so that the molds are secured together with the mating surfaces in contact with each other. The clamp assembly includes a pair of clamp members for engagement with the flanges of the molds, a shaft passing through the clamp members, a first stop member provided on the shaft for engagement with one of the clamp members, a spacer provided on the shaft for axial slidable movement and adapted for engagement with the other of the clamp members, a second stop member provided on the shaft for engagement with the spacer at an end opposite to the other of the clamp members. The shaft is made of a material having a coefficient of thermal expansion which is smaller than that of a material from which the spacer is made so that the spacer has a thermal expansion in the axial direction which is not smaller than a thermal expansion in the axial direction of the shaft under the same temperature increase.

10 Claims, 5 Drawing Sheets

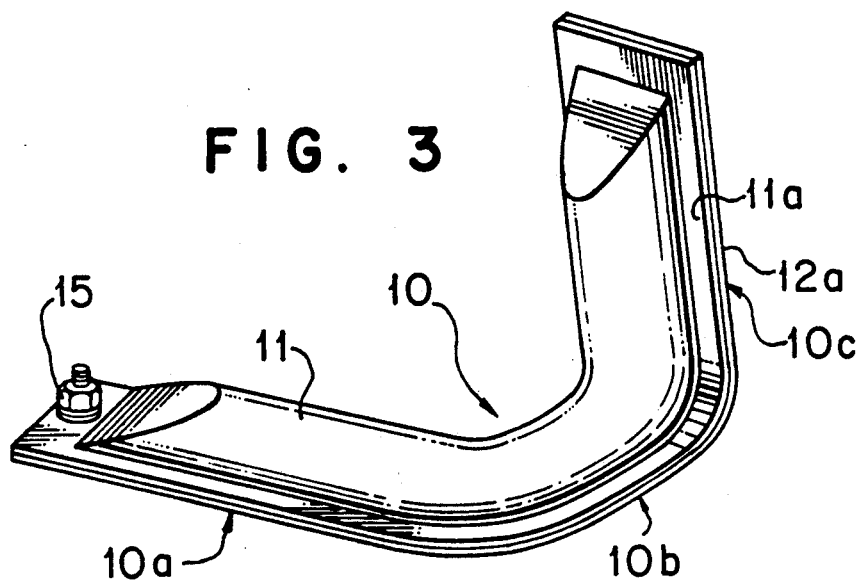
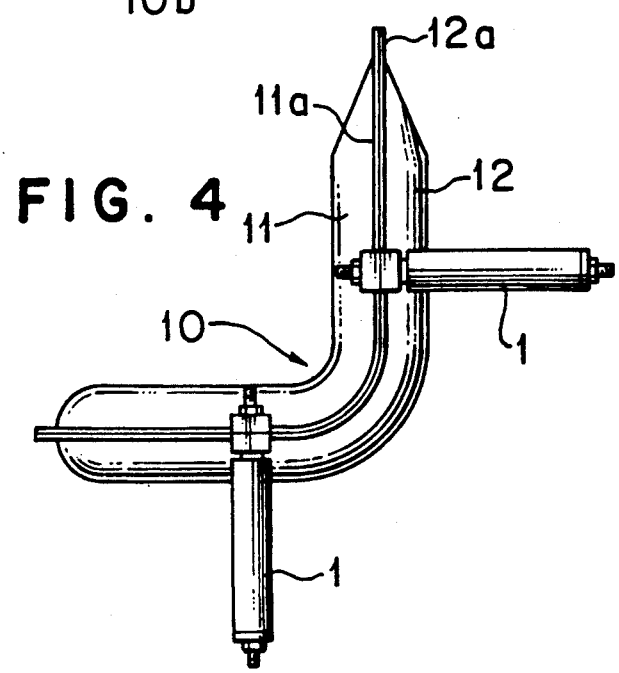
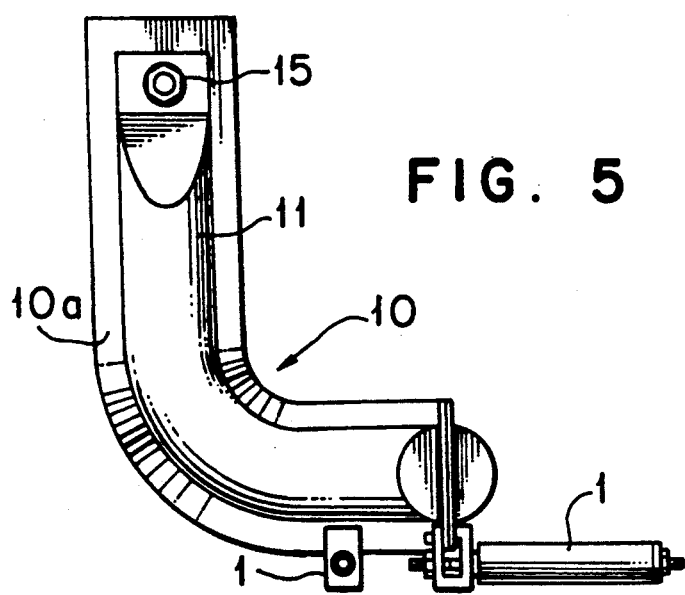

APPARATUS FOR FORMING THERMOPLASTIC MATERIAL

BACKGROUND OF THE INVENTION

1. Field of the Invention

The present invention relates to a process and apparatus for forming a product of a thermoplastic material. More particularly, the present invention pertains to a process and apparatus for manufacturing a product made of a thermoplastic material by placing a pair of sheets of a thermoplastic resin between a pair of molds and injecting pressurized gas between the pair of thermoplastic resin sheets so that the sheets are deformed under the gas pressure along the mold cavities.

2. Description of the Prior Art

Known processes for manufacturing a thermoplastic resin product includes a so-called blow molding in which a pair of resin sheets are placed between a pair of molds and pressurized gas is introduced between the sheets to form the sheets along the forming surfaces of the molds. In the case where the blow molding is applied to a forming of a thermoplastic resin, the molds may be mounted on a hot press machine so that the molds are heated during the forming process. Alternatively, the molds may be provided with heaters which are embedded therein and the forming process may be carried out in a press machine.

In the conventional processes, the molds are forced toward each other by means of a press only in one direction. Therefore, the processes can be applied for a manufacture of a product having relatively planar mating surfaces. Another problem inherent to the conventional processes is that the molds used in these processes must be of precisely machined ones so that they can be used in a press machine. It should further be noted that there is a limit in the conventional processes in respect of the size of the products made by these processes since the processes must be carried out in press machines. A further problem in the conventional processes is that the part halves produced by the pair of resin sheets are not attached together at the time of molding so that they have to be joined together after the molding process.

SUMMARY OF THE INVENTION

It is therefore an object of the present invention to solve the problems in the conventional processes that they can be applied only to the manufacture of a product having a substantially planar mating surface due to the limitation of the direction of pressing and that expensive molds must be provided for use in a press.

Another object of the present invention is to provide a process for manufacturing a thermoplastic product which can be applied to a manufacture of a product of a relatively complicated configuration.

A further object of the present invention is to provided a process for manufacturing a thermoplastic product which can be carried out with relatively inexpensive molds such as molds made of sheet metals.

Still further object of the present invention is to provide a process for manufacturing a thermoplastic product in which the product halves are joined together at the mating surfaces when the product is being formed.

Still further object of the present invention is to provide novel clamp means for securing molds during the forming process.

Yet further object of the present invention is to provide clamp means for securing together the molds during molding process with a clamping force which does not decrease even under an elevated temperature.

In order to accomplish the above and other objects, the process in accordance with the present invention is carried out with molds having peripheral flanges and clamp means adapted to be engaged with the flanges of the molds to secure the molds together with a clamping force which does not decrease in response to an increase in temperature. More particularly, the present invention provides a process for manufacturing a product of a thermoplastic resin which includes steps of providing molds having peripheral flanges respectively formed with mating surfaces, placing sheets of a thermoplastic resin between the molds so that peripheral portions of said sheets are positioned between said mating surfaces of said flanges in the molds, clamping said molds at the peripheral flanges with clamp means which is of a type that can provide a clamping force which does not decrease in response to an increase in temperature, heating said molds to a forming temperature of the thermoplastic resin and injecting pressurized gas between said sheets of the thermoplastic resin to form said sheets and make the peripheral portions of said thermoplastic resin sheets joined together. In accordance with the present invention, the process may be carried out by at first forming the thermoplastic resin sheets under a softening temperature of the resin and then heating the molds to a temperature which is higher than the softening temperature such as a melting temperature to weld the peripheral portion of the sheets.

According to a further aspect of the present invention, there is provided an apparatus for carrying out the aforementioned process. The apparatus includes a pair of molds each having a peripheral flange provided with a mating surface, and clamp means for clamping said flanges of the molds so that the molds are secured together. The clamp means includes a pair of clamp members for engagement with said flanges of the molds, shaft means passing through said clamp members, first stop means provided on said shaft means for engagement with one of said clamp members, spacer means provided on said shaft means for axial slidable movement and adapted for engagement with the other of said clamp members, second stop means provided on said shaft means for engagement with said spacer means at an end opposite to the other of said clamp members, said shaft means are made of a material having a coefficient of thermal expansion which is smaller than that of a material from which said spacer means is made. At least one of said first and second stop means is made adjustable in the axial direction with respect to said shaft means so that the spacer means has a thermal expansion in the axial direction which is not smaller than a thermal expansion in the axial direction of said shaft means under the same temperature increase. The present invention further provides a clamping device which can provide a clamping force which does not decrease even under an increase in temperature.

According to the features of the present invention, the spacer means has a thermal expansion which is greater than the thermal expansion of the shaft means so that the spacer means shows a greater axial expansion under the forming temperature than the shaft means does. Therefore, the clamp member is forced by the second stop means toward the flange of the mold. Thus, the clamping force of the clamp means is increased in response to an increase in temperature to apply an increased pressure to the peripheral portions of the thermoplastic resin sheets which are held between the flanges of the molds. Under the pressure, the peripheral portions of the thermoplastic resin sheets are welded together.

With a conventional clamping structure the flanges of the molds can be clamped with an adequate clamping force prior to the forming process. However, there is a tendency that the clamping force is decreased in response to an increase in temperature so that it is difficult to maintain the clamping force which is sufficient to cause the welding of the peripheral portions of the thermoplastic resin sheets. In accordance with the features of the present invention, however, the clamp means is of a type that the clamping force is increased in response to an increase in temperature so that it is possible to produce a clamping force which is sufficient to to cause the weld of the peripheral portions of the thermoplastic resin sheets.

The above and other objects and features of the present invention will become apparent from the following description of a preferred embodiment taking reference to the accompanying drawings.

BRIEF DESCRIPTION OF THE DRAWINGS

FIG. 3 is a perspective view showing one example of the mold assembly which can be used in the process of the present invention;

FIG. 4 is a front view of the mold assembly shown in FIG. 3;

FIG. 5 is a plan view of the mold assembly shown in FIGS. 3 and 4;

DESCRIPTION OF THE PREFERRED EMBODIMENT

Figure 1:
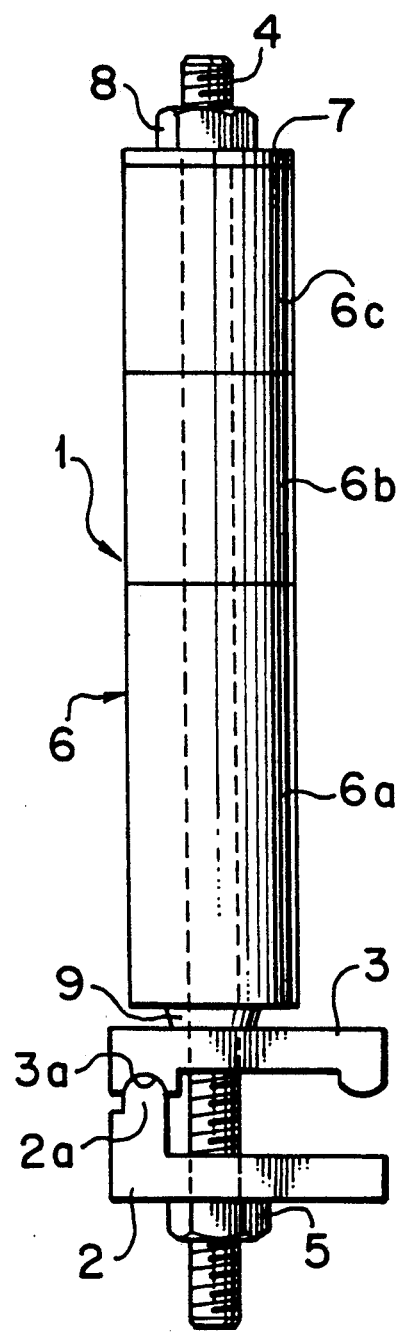
FIG. 1 is a side view showing one example of the clamp assembly in accordance with the present invention.
Figure 2:
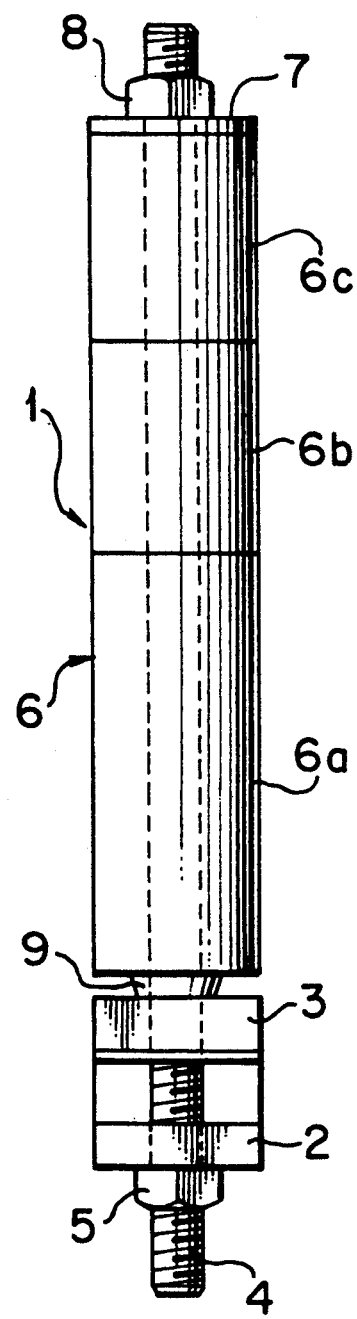
FIG. 2 is a front view of the clamp assembly shown in FIG. 1.

Referring to the drawings, particularly to FIGS. 1 and 2, there is shown one example of the clamp assembly in accordance with the present invention. The clamp assembly shown therein is designated by the reference numeral 1 and includes a pair of clamp members 2 and 3. The clamp member 2 is formed with a fulcrum 2a and the clamp member 3 is formed with a fulcrum support 3a for receiving the fulcrum 2a of the clamp member 2. The clamp members 2 and 3 are engaged with each other at the fulcrum 2a and the fulcrum support 3a. A screw shaft 4 is provided to pass through the clamp members 2 and 3 and has one end threadably engaged with a nut 5. The clamp members 2 and 3 and the nut 5 are made of steel.

Above the clamp member 3, there is provided a spacer 6 which is made of an aluminum based alloy. The shaft 4 is passed through the spacer 6. In the illustrated embodiment, the spacer 6 is constituted by three spacer parts 6a, 6b and 6c. Above the spacer part 6c, there is provided a washer 7 and a nut 8 is threadably engaged with the shaft 4 at a position above the washer 8. Between the spacer part 6a and the clamp member 3, there is provided a washer 9 of a conical configuration.

Figure 6:
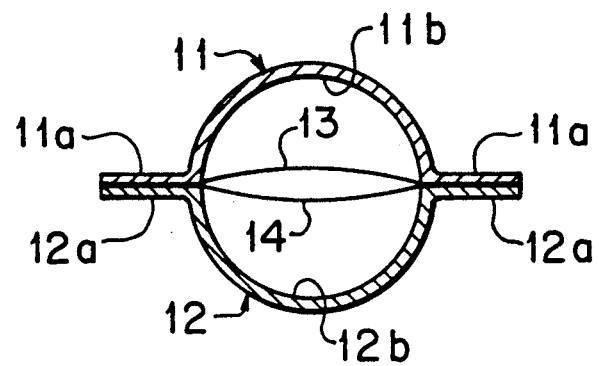
FIG. 6 is a sectional view of the mold assembly.

Referring now to FIGS. 3 and 4, there is shown a mold assembly 10, which is used in the process in accordance with the present invention. The mold assembly 10 includes an upper mold 11 and a lower mold 12 which are respectively formed at peripheral portions with flanges 11a and 12a. The flanges 11a and 12a have mating surfaces which are engaged together in a gas-tight manner. As shown in FIG. 3, the mold assembly 10 includes a first horizontal section 10a, a second horizontal section 10b which extends in the plane of and substantially perpendicularly to the first horizontal section 10a and a vertical section 10c which is contiguous to the second horizontal section 10b and extends in a vertical direction. It should therefore be understood that the flanges 11a and 12a of the molds 11 and 12 are correspondingly bent so that they conform to the configuration of the mold assembly 10. As shown in FIG. 6, the upper mold 11 and the lower mold 12 are of semicircular cross-sectional configuration and formed at inner sides with forming surfaces 11b and 12b, respectively.

Figure 7:
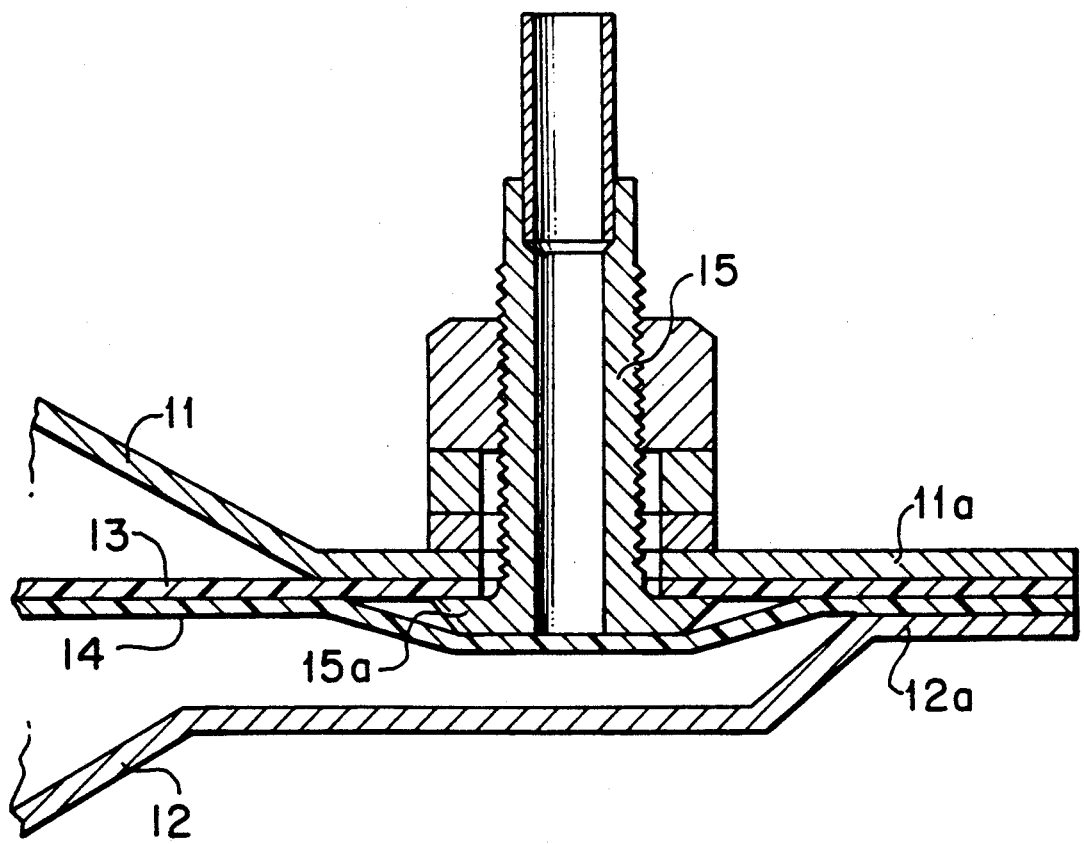
FIG. 7 is a sectional view on an enlarged scale of the gas injecting nozzle assembly.
Figure 8A:
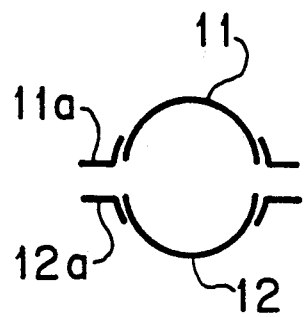
FIGS. 8 (a), (b), (c), (d) and (e) show forming process using the mold assembly shown in FIGS. 3 through 6.
Figure 8B:
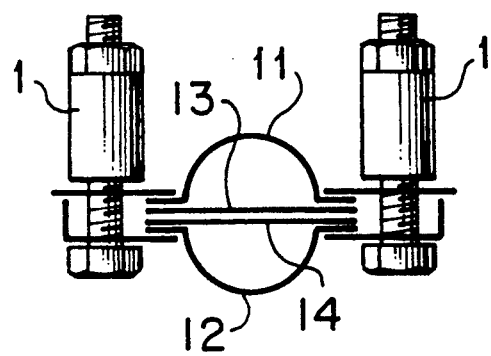
Figure 8C:
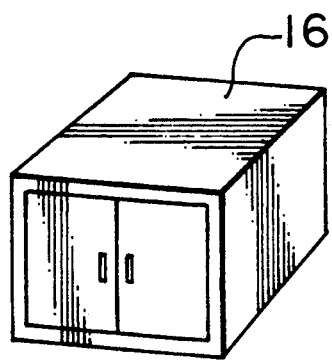
Figure 8D:
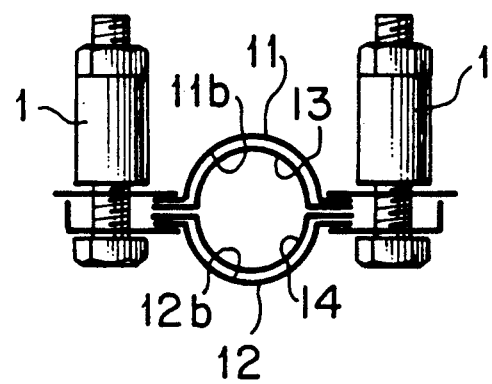
Figure 8E:
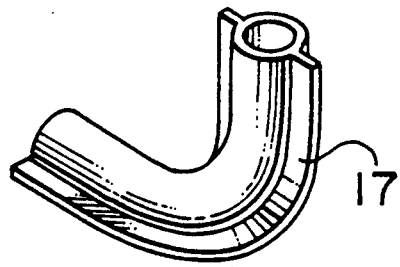

Referring to FIG. 6, it will be noted that a pair of thermoplastic resin sheets 13 and 14 are placed in the mold assembly 10 with peripheral portions held between the mating surfaces formed on the flanges 11a and 12a of the molds 11 and 12, respectively. The mold assembly 10 is provided at one end with a nozzle assembly 15 for injecting pressurized gas between the resin sheets 13 and 14. FIG. 7 shows details of the injecting nozzle assembly 15. The nozzle assembly 15 has a nozzle member having a nozzle end 15a which is passed through an aperture formed in the upper mold 11 and located between the resin sheets 13 and 14.

In the manufacturing process, the thermoplastic resin sheets 13 and 14 are thus located in the mold assembly 10 and the injecting nozzle assembly 15 is positioned a shown in FIG. 7. Then, the flanges 11a and 12a of the molds 11 and 12 are secured together by the clamp assemblies 1 which are of the type as shown in FIGS. 1 and 2. More specifically, the flanges 11a and 12a of the molds 11 and 12 are held between the clamp members 2 and 3 of the clamp assemblies 1 at appropriate positions and nuts 5 and 8 are tightened to apply the flanges 11a and 12a with a desired tightening force.

FIGS. 8 (a), (b), (c), (d) and (e) show one example of the process in accordance with the present invention. Referring to FIGS. 8 (a) and (b), there are shown provisional steps which have already been described. In these provisional steps, the thermoplastic resin sheets 13 and 14 are placed in the mold assembly 10 and the molds 11 and 12 are tightened together by means of the clamp assemblies 1. The mold assembly 10 thus prepared is brought into a heating furnace 16 to be heated to a softening temperature of the resin. Then, the pressurized gas is introduced between the resin sheets 13 and 14 so that the sheets 13 and 14 are formed along the forming surfaces 11b and 12b of the molds 11 and 12. As the forming step proceeds, the temperature is increased to the melting point of the resin. Since the peripheral portions of the resin sheets 13 and 14 ,are held between the flanges 11a and 12a of the molds 11 and 12 and tightening pressure is applied to 11a and 12a by the clamp assemblies 1, the peripheral portions of the resin sheets 13 and 14 are welded together.

As described with reference to FIGS. 1 and 2, the shaft 4 of the clamp assembly 1 is made of steel and the spacer 6 is made of aluminum alloy, so that the spacer 6 has a greater thermal expansion than the shaft 4 when the temperature of the clamp assembly 1 is increased. It will therefore be understood that the clamping force applied by the clamp assembly 1 to the flanges 11a and 12a of the molds 11 and 12 does not decrease even when the temperature is increased. The tightening force can even be increased in response to an increase in temperature by appropriately determining the axial dimension of the spacer 6. Under the influence of the tightening force applied by the clamp assembly 1, the peripheral portions of the resin sheets 13 and 14 are welded together as already described. When the forming step and the welding step are completed, the formed part is taken out of the mold assembly 10 and appropriately trimmed to obtain a finished product.

Figure 9:
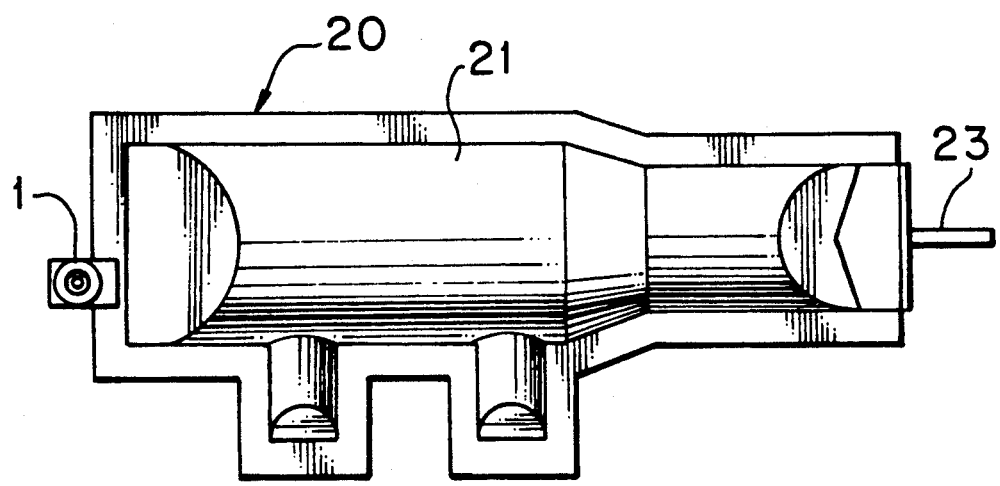
FIG. 9 is a plan view showing another example of the mold assembly.
Figure 10:
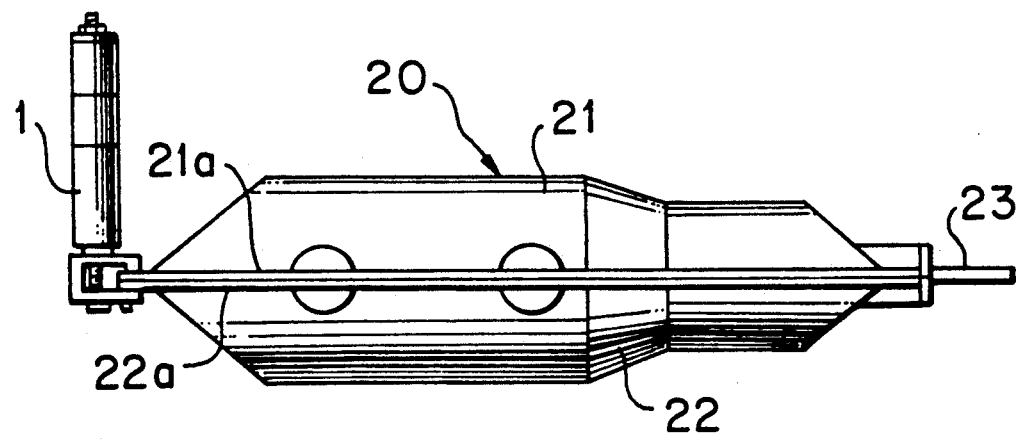
FIG. 10 is a side view of the mold assembly shown in FIG. 9.

Referring to FIGS. 9 and 10, there is shown another embodiment of the present invention which uses a mold assembly 20. The mold assembly 20 includes an upper mold 21 and a lower mold 22 which respectively have peripheral flanges 21a and 22a. The mold assembly 20 is provided at one end with a nozzle assembly 23 for injecting pressurized gas. Sheets of a thermoplastic resin are placed in the mold assembly 20 as in the previous embodiment. The molds 21 and 22 are clamped together by appropriate number of the clamp assembly 1 although only one is shown in FIGS. 9 and 10.

The invention has thus been shown and described with reference to specific examples, however, it should be understood that the invention is in no way limited to the details of the illustrated structures and the described processes but changes and modifications may be made without departing from the scope of the appended claims.

I claim:

1. An apparatus for manufacturing a product of a thermoplastic resin which includes a pair of molds each having a peripheral flange provided with a mating surface, and clamp means for clamping said flanges of the molds so that the molds are secured together with the mating surfaces in contact with each other, said clamp means including a pair of clamp members for engagement with said flanges of the molds, shaft means passing through said clasp members, first stop means provided on said shaft means for engagement with one of said clamp members, spacer means provided on said shaft means for axial slidable movement and adapted for engagement with the other of said clamp members, second stop means provided on said shaft means for engagement with said spacer means at an end opposite to the other of said clamp members, said shaft means being made of a material having a coefficient of thermal expansion which is smaller than that of a material from which said spacer means is made so that the spacer means has a thermal expansion in the axial direction which is not smaller than a thermal expansion in the axial direction of said shaft means under the same temperature increase.

2. An apparatus in accordance with claim 1 in which at least one of said first and second stop means is made adjustable in the axial direction with respect to said shaft means.

3. An apparatus in accordance with claim 1 in which mating surfaces of said molds include at least a first section located in a first plane and a second section which extends in said first plane at an angle with respect to said first section.

4. An apparatus in accordance with claim 3 in which mating surfaces of said molds include a third section which extends from said second section at an angle with respect to said first plane.

5. A clamping device for use with a pair of molds each having a peripheral flange provided with a mating surface for providing a clamping force which does not decrease even under an increase in temperature so that the molds are secured together with the mating surfaces in contact with each other, said clamping device including a pair of clamp members for engagement with flanges of a mold, shaft means passing through said clamp members, first stop means provided on said shaft means for engagement with one of said clamp members, spacer means provided on said shaft means for axial slidable movement and adapted for engagement with the other of said clamp members, second stop means provided on said shaft means for engagement with said spacer means at an end opposite to the other of said clamp members, said shaft means being made of a material having a coefficient of thermal expansion which is smaller than that of a material from which said spacer means is made so that the spacer means has a thermal expansion in the axial direction which is not smaller than a thermal expansion in the axial direction of said shaft means under the same temperature increase.

6. A clamping device in accordance with claim 5 in which at least one of said first and second stop means is adjustable with respect to said shaft means in the axial direction.

7. A clamping device in accordance with claim 5 in which said shaft means is made of steel and said spacer means is made of aluminum based alloy.

8. A clamping device in accordance with claim 1 in which said shaft means is made of steel and said spacer means is made of aluminum based alloy.

9. A clamping device in accordance with claim 1 in which said spacer means is a nonresilient elongated sleeve on said shaft means.

10. A clamping device in accordance with claim 5 in which said spacer means is a non-resilient elongated sleeve on said shaft means.

* * * * *